United States Patent [19]
Culver

[11] 3,771,228
[45] Nov. 13, 1973

[54] FRICTION WHEEL MEASURING DEVICE

[75] Inventor: Irven H. Culver, Playa Del Rey, Calif.

[73] Assignee: Primus Mfg., Inc., San Lorenzo, P.R.

[22] Filed: Oct. 12, 1971

[21] Appl. No.: 188,314

[52] U.S. Cl............................... 33/141 R, 33/125 M
[51] Int. Cl. ............................................. G01b 3/12
[58] Field of Search ..............................33/129–130, 131, 132, 133, 134, 141, 141.5, 142, 124, 125 M; 226/193

[56] References Cited
UNITED STATES PATENTS

| | | | |
|---|---|---|---|
| 3,307,265 | 3/1967 | Jenks et al. ....................... | 33/125 M |
| 2,110,757 | 3/1938 | Clarke ................................. | 33/142 |
| 819,096 | 5/1906 | Teate .................................. | 33/132 |

FOREIGN PATENTS OR APPLICATIONS

| | | | |
|---|---|---|---|
| 449,028 | 12/1912 | France .............................. | 33/141 R |
| 17,840 | 0/1888 | Great Britain ..................... | 33/141 C |

*Primary Examiner*—Harry N. Haroian
*Attorney*—Richard D. Seibel et al.

[57] ABSTRACT

A distance measuring device having a variable radius frictionally driven measuring wheel is described. The repeatability of measurements made by the measuring device is improved by providing a plurality of randomly spaced apart ridges on the periphery of the measuring wheel with the long axis of the ridges extending transverse to the circumference of the wheel. Accuracy of measurement is assured by an adjusting method wherein the wheel is disengaged from the measurement surface during adjustment and the wheel moved to prevent it from following in a track previously made in the measurement surface.

12 Claims, 6 Drawing Figures

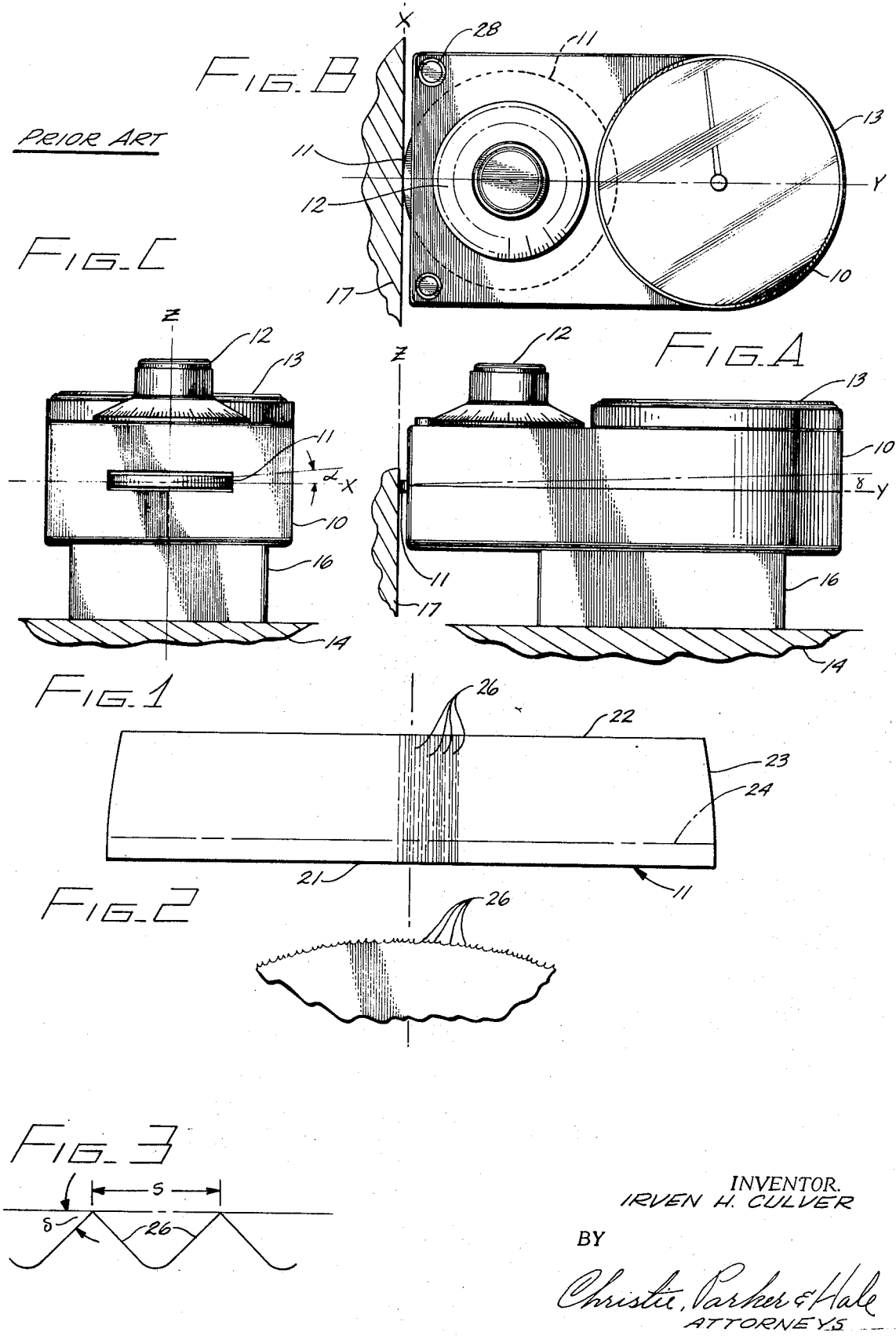

FRICTION WHEEL MEASURING DEVICE

BACKGROUND

This invention relates to friction wheel distance measuring devices of the type described in U.S. Pat. Nos. 3,311,985 and 3,378,929. As taught in these patents a measuring device may be mounted on a lathe carriage, for example, to traverse along the lathe bed during a machining operation. A friction wheel on the measuring device engages a portion of the lathe bed so as to roll along it as the carriage traverses. In a typical embodiment a precision gear train in the measuring device magnifies the rotation of the measuring wheel for indication on a dial indicator or the like. Direct reading or other amplification techniques can be used as desired. Since the circumference of the wheel is known with precision, exact measurement of distance of travel of the lathe carriage can be obtained by reading the indicator. Such a distance measuring instrument can be mounted on other machine tools or employed in other applications.

Precision friction wheel distance measuring devices have found wide acceptance throughout industry in many applications. The measuring device which is most widely used is marketed by the assignee of this invention in conjunction with the trademark "TRAV-A-DIAL." Such measuring instruments are calibrated in units as small as five ten-thousandths (0.0005) of an inch or 0.01 centimeter or even 0.0001 inch, and the distance measured equals the circumference of the measuring wheel, which is very accurately controlled, before recycling of the distance indicator occurs. A friction wheel measuring device having a measuring capacity many times the circumference of the measuring wheel is marketed by the assignee of this invention in conjunction with the trademark "TEDD." Such a device may operate over distances of 100 inches or more before recycling of the measuring indication occurs. It was with the advent of such extended readout measuring instruments that problems of repeatability were principally noticed.

Accuracy of a measuring instrument is defined as the ability of the instrument to indicate the exact distance measured after traversing a path to be measured. Thus, for example, accuracy may be ascertained by traversing the measuring instrument over a path known with great precision, such as for example as may be determined with conventional gauge blocks or the like. If one traverses a distance measuring instrument over a ten inch path as determined by gauge blocks, the measuring indication should be precisely ten inches. Accuracy is a measure of the ability of the instrument to achieve such a result.

Repeatability is a measure of the ability of the measuring device to read "zero" when returned to its original position after motion away from and back to the original position. Thus, for example, a measuring device may be set at zero, traversed several times back and forth over a path of 50 inches and returned to its original position. Any deviation from a zero reading upon return to the original position is considered a repeatability error. It has been found that such repeatability errors arise from mechanical hysteresis in the devices being measured or in the mounting structure for the measuring device. This mechanical hysteresis typically arises from nonreciprocal elastic deformations and after several such traversal cycles a substantial error may be accumulated.

A distance measuring instrument may have a high degree of accuracy and present no repeatability problems when operated over short distances, but the same instrument used in exactly the same mounting on the same machine tool may show repeatability errors without any change in accuracy when operated a number of times over great distances. The magnitude of the repeatability error may vary for the same measuring instrument from one machine tool to another even when the machine tools are nominally identical.

U.S. Pat. Nos. 3,307,265 and 3,561,121 describe a friction wheel distance measuring device wherein the friction wheel has a perimeter in the form of an arcuate surface so that the effective radius and, hence, circumference of the measuring wheel is variable by tilting the distance measuring device in a direction transverse to the path along which distance is to be measured. Such an arrangement improves the accuracy of distance measurement with the device.

U.S. Pat. No. 3,561,120 describes a technique for increasing the repeatability of measurements made with a friction wheel measuring device by skewing the device relative to the direction of the path to be measured.

Prior Art Adjustment Techniques

FIGS. A, B, and C illustrate in plan, end, and elevation view, respectively, a distance measuring instrument of the friction wheel variety. Although these figures represent the prior art instrument, they also illustrate schematically an instrument suitable for practice of this invention.

As illustrated in these drawings there is an instrument housing 10 within which a measuring wheel 11 is rotatably mounted. The measuring wheel 11 has a small portion of its periphery extending through an end of the housing 10. A knob 12 is coupled to the wheel 11 and has calibration marks (not shown) readable on the top face of the measuring instrument. Typically one full revolution of the knob corresponds to one full revolution of the wheel. In some embodiments an arrangement may be used wherein the knob rotates a full revolution only after several rotations of the measuring wheel. Within the housing 10 and not illustrated herein is a conventional anti-backlash motion amplification gear train interconnecting the wheel 11 and a dial indicator 13 calibrated in thousandths of an inch or hundredths of a centimeter as may be desired. Thus, the calibration markings on the knob 12 provide a coarse indication of the distance traversed by the wheel and the dial indicator provides a fine indication of the same. If the wheel has a 6 inch circumference, the measuring indication repeats after six inches. In other embodiments not shown, an electronic sensor of wheel rotation is used which accumulates the rotations so that many circumferences can be traversed before the indication repeats. Other indicators, motion amplifiers and the like can be used.

The measuring instrument is mounted on a movable portion 14 of a machine tool by a support base 16, shown only schematically herein. The movable portion 14 may, for example, be the carriage of a lathe or other movable portion of a machine tool. The measuring wheel 11 of the instrument is in frictional engagement with a fixed portion 17 of the machine such as a guide way of the lathe bed; this frictional engagement is assured by a bias force applied to housing 10 by the support base. Thus, as the carriage 14 traverses along the lathe bed, the wheel 11 rolls along the guide way 17, thereby rotating the knob 12 and dial gauge 13. By reading the knob and dial gauge, the distance traversed can be measured.

Support base or mounting base as used herein refers to the various mechanisms used for attaching the measuring instrument to a machine tool and providing the needed adjustments. The support base takes a variety of forms depending on the type and make of machine tool and a number of conventional and special purpose bases are known. The support base may include a mounting base as described in U.S. Pat. No. 3,378,929 which provides a spring bias urging the instrument against a measurement surface. It may also include a mounting bracket such as described in U.S. Pat. No. 3,307,265 for interconnecting the measuring instrument and the tool and also for adjusting the angular relations therebetween. A variety of other means for adjusting position, angle and bias force of the instrument will be apparent to one skilled in the art, and the support or mounting base is, therefore, shown only generally.

FIGS. A, B, and C indicate for purposes of exposition a set of Cartesian coordinates related to the surface (a measurement surface) on which the measuring wheel 11 runs. The X direction is considered to be in the principal direction of traverse of the indicator, that is, for example, along the length of the guide way 17. The X axis would approximate a tangent to the measuring wheel 11. The Z axis is defined in a direction normal to the principal direction of traverse of the wheel and approximately parallel to the axis of rotation to the wheel. The Y axis is, of course, normal to the X and Z axes and the XY plane is approximately the plane in which the measuring wheel 11 lies.

As pointed out hereinafter, to obtain accurate readings the measuring device must also be properly angularly positioned, and therefore an angle $\alpha$ is defined as rotation about the Y axis as seen in FIG. C. As used herein, this may also be referred to as "skew" of the measuring wheel. Another angle of interest is illustrated in FIG. A as $\gamma$ which is a measure of the rotation of the measuring instrument around the X axis, which may herein be referred to as "tilt." It will be recognized that in the drawings of this application the angles $\alpha$ and $\gamma$ are greatly exaggerated for purposes of illustration. It should also be noted that in the course of adjusting the angles of a measuring instrument, the centers of actual rotation may not be and often are not at the center of the coordinate system just defined. Their exact position is typically determined by the particular support 16 chosen.

As set forth in detail in U.S. Pat. No. 3,561,121, the measuring wheel preferably has a relatively larger radius, and hence circumference, nearer one face and a relatively smaller radius nearer the other face with the peripheral surface therebetween being arcuate. In the instrument of FIGS. A, B, and C the line of maximum circumferential extent around the wheel lies in a plane perpendicular to the wheel axis of rotation and is nearer the lower face of the wheel than the upper face. When the measuring instrument is aligned so that the axis of rotation of the wheel is perpendicular to the Y axis (angle $\gamma$ equals zero), the line of maximum circumferential extent around the wheel lies in contact with the fixed portion 17 of the machine tool. Further, as the measuring instrument is tilted up to increase the angle $\gamma$ (FIG. A), contact between the wheel 11 and fixed portion 17 lies along a line of lesser circumferential extent.

The support base 16 is a conventional element such as described in the aforementioned U.S. patents. For purposes of practice of this invention various adjustments can be made by using the base in a conventional manner. The position of the instrument along the Y axis can be adjusted, typically, for example, by a dovetail (not shown). In addition to adjustment in the Y direction, means are provided for applying a spring force on the instrument for applying a relatively large (40 pounds being recommended for a TRAV-A-DIAL device) and preferably substantially constant load between the measuring wheel and the measurement surface. This force assures frictional engagement and minimizes the possibility of slippage of the wheel which could introduce substantial and random measurement errors. The metal elastic crowding (see U.S. Pat. No. 3,307,265) that must be compensated for to assure accuracy arises from the force exerted by the measurement wheel on a small area of the measurement surface. Even with relatively small forces the metal elastic crowding may be substantial since the area of contact is concomitantly small. The effect increases with increasing force, but not linearly and substantial force is preferred to minimize magnitude of changes in effect in response to minor changes of force.

The base 16 also provides set screws or the like (not shown) for skewing the instrument about the Y axis by an angle $\gamma$ and for tilting the instrument about the X axis by an angle $\gamma$. Movement of the instrument during adjustment for skew actually occurs about an axis displaced from the intersection of the measuring wheel with the measurement surface. Thus, as the angle $\alpha$ is changed slight rotation of the wheel in engagement with the measuring surface may also occur. Similarly the center of rotation of the instrument as the tilt is changed is displaced from the intersection between the wheel and measurement surface, and it has therefore been desirable to merely remove or relax the spring loading of the instrument against the measurement surface during accuracy adjustments to prevent overloading of the spring system and possible damage to the instrument.

As pointed out in U.S. Pat. No. 3,561,121 it has been found that a localized deformation phenomenon (termed "metal elastic crowding") in the wheel and the measurement surface against which it rides may cause an erroneously low distance measurement to be obtained with a friction wheel measuring device. By tilting the measurement instrument about an angle $\gamma$ the effective circumference of the wheel in contact with the measurement surface is decreased, thereby compensating for errors attributable to metal elastic crowding. Thus, the accuracy of the measuring instrument is assured and the distances indicated thereby are accurately the distances actually traversed.

The effects of metal elastic crowding are reversible and compensation assures accuracy. Metal elastic crowding does not cause repeatability errors.

Repeatability errors associated with operation of friction wheel measuring devices are produced by nonreciprocal deflection of both the components of the machine tool itself and of the structure mounting the measuring device on the machine tool. Such deflections are very slight but they are sufficient in magnitude to produce repeatability errors in a friction wheel measuring device operated over large distances, particularly when there are repeated cycles of measurement. The fact that such a measuring instrument can detect the slight elastic hysteresis of the machine tool testifies to the inherent great accuracy and sensitivity of such devices.

U.S. Pat. No. 3,561,120 provides a technique for mounting a friction wheel measuring instrument to compensate for, and thereby effectively eliminate repeatability errors due to nonreciprocal deflections. Repeatability errors are avoided without affecting accuracy.

The elements of a machine tool are typically constrained to have only one degree of freedom of movement. Machines are designed to minimize deflections in all directions except the one intended motion. Unavoidable deflections in other directions lead to errors. Errors may also be introduced in worn machines or due to built-in tolerances giving "looseness" or backlash in directions other than the one intended direction. The measuring device is mounted on one element of the machine so that the measuring wheel is in frictional rolling engagement with the surface on the second element, which is parallel to the direction of desired gross relative movement between the elements. In order to compensate for repeatability errors, the magnitude of such error generated when the device is mounted with the plane of rotation of the wheel parallel to the line of the gross relative movement is first determined. The measuring device is then adjusted so that the plane of measuring wheel rotation is displaced from parellism to the line of gross relative movement by an amount which compensates for the repeatability error.

That is, the measuring device is intentionally mounted so that in an at rest state, the measuring wheel appears to track slightly skewed to the direction of relative travel permitted between the two machine tool elements, and such angle of skew is by an amount that inherently compensates for repeatability errors which would otherwise be encountered. Such intentional initial skew mounting of the device, contrary to what would be expected, does not produce measurement accuracy errors regardless of the amount of gross relative movement encountered between the elements. The terms "gross relative movement" is used to designate the principal intended mode of movement relied upon to operate the measuring device and to distinguish such move of movement from the undesired very small movements which produce repeatability errors.

The technique of skewing the measuring instrument can be seen in FIG. C. The instrument is initially aligned with the plane of the wheel 11 parallel to the XY plane. When a repeatability error is ascertained, the instrument may be skewed by an angle $\alpha$ so as to no longer be parallel to the X axis. The magnitude of the angle $\alpha$ to which the instrument should be skewed is determined empirically.

Adjustment of the measuring instrument for repeatability error is set forth in detail in the aforementioned U.S. Pat. No. 3,561,120. According to this technique the indicators 12 and 13 of the measurement instrument are adjusted to show a zero reading with the instrument in a known position, preferably against a fixed stop defined by the structure of the lathe. The lathe carriage or the like is then moved several times (ten times, for example) back and forth as far as possible along the lathe bed from its original position. Because of the nonreciprocal deflections of the lathe, the measuring device may show a measurement error after the first round trip traverse of the carriage along the lathe bed, and such errors for each traverse accumulate additively so that after several traverses the indicators will show a definite value different from the initial zero reading. The mounting base 16 is then adjusted, with the carriage stationary, so that the fine measuring indicator 13 shows travel of the measuring wheel in a direction returning the indicator towards a zero reading. The amount of return towards zero depends on the length of traverse but is typically sufficient to drive the dial indicator half way to a zero reading.

The carriage is then traversed again several times back and forth along the lathe bed and any accumulated residual error shown by the indicator is noted. Skew of the measuring instrument is again adjusted to gradually approach a skew mounting angle introducing a corrective "error" equal in magnitude and opposite in sign to the repeatability error introduced by the nonreciprocal deflections of the machine tool. Such adjustment can be tedious and time consuming and has required rather precise initial adjustment of the measuring device with the plane of the measuring wheel parallel to the XY plane. It is desirable to avoid such precise initial adjustment and to ease the difficulty and reduce the time to make the required adjustment for repeatability error without affecting accuracy.

BRIEF SUMMARY OF THE INVENTION

There is, therefore, provided in practice of this invention means for reducing the sensitivity of a friction wheel distance measuring instrument to skew tracking by providing a plurality of randomly spaced-apart ridges on the periphery of the wheel, and by having the long axis of the ridges transverse to the circumference of the measuring wheel.

DRAWINGS

These and other features and advantages of the present invention will be appreciated as the same becomes better understood by reference to the following detailed description of a presently preferred embodiment when considered in connection with the accompanying drawings wherein:

FIGS. A to C illustrate a prior art measuring instrument;

FIG. 1 illustrates in side view a measuring wheel for practice of this invention;

FIG. 2 illustrates in end view a fragment of the periphery of the wheel of FIG. 1; and FIG. 3 illustrates schematically ridges on the wheel of FIG. 1.

DESCRIPTION

The ultimate cause of repeatability error in a friction wheel distance measuring instrument is nonreciprocal deflection of the machine tool and the bracketry by which the measuring instrument is mounted thereto. These deflections produce (1) skew tracking of the measuring wheel relative to the direction of gross relative movement between the measuring wheel and the measurement surface; (2) variations in the tilt ($\gamma$) of the metering wheel relative to the measurement surface; or (3) variations in the force of engagement of the measuring wheel with the measurement surface. These three effects may be produced simultaneously or separately by nonreciprocal deflection of the machine tool and the mounting structure for the measuring instrument.

The deflections of the machine tool and mounting structure are nonreciprocal in that they are different in nature and magnitude for one direction of travel along the machine tool than for travel in the opposite direction. If the elastic deformations were reciprocal, that is, the same in both directions, the measuring instrument would produce repeatable results. The degree of nonreciprocity and hence the repeatability error is not readily predictable and is therefore determined empirically by simply measuring the repeatability error.

The measuring instrument has six degrees of freedom relative to the measurement surface, namely, translation along each of the three directions and rotation or pivotaing about each of the three axes. Only three of these 6° of freedom are actually of concern as regards measurement accuracy or repeatability. Rotation of the measuring instrument about the Y axis (angle $\alpha$) produces skew tracking. Rotation of the instrument about the X axis (angle $\gamma$) produces a variation in the effective diameter of the metering wheel 11. Translation of the measuring instrument along the Y axis may produce a variation of the force of engagement of the measuring wheel with the measurement surface, thereby producing a variation in the magnitude of the metal elastic crowding.

The deflection-induced tendency of the measuring wheel to track skew to the direction of gross relative movement of the instrument along the X direction is not directly a source of concern. Skew tracking of the measuring wheel, however, produces a change in the tilt $\gamma$ of the measuring wheel and often, also, a difference between the force of engagement of the wheel with the measurement surface during movement of the instrument in opposite directions. X axis translation turns out to be no problem at all. Z axis translation is either no problem due to sliding of the wheel parallel to its axis of rotation, or because of the forceful engagement of the metering wheel with the measurement surface it is reflected as X axis rotation (angle $\gamma$) by reason of deflection of the mounting structure for the measuring instrument. Z axis rotation is reflected as X axis translation.

In summary, because of the various cross coupling effects between the different degrees of freedom, skew tracking of the measuring wheel may produce changes in the tilt angle of the measuring wheel relative to the measurement surface and hence of effective wheel diameter. Cross coupling effects may also cause skew tracking to be manifested as changes in the force of engagement of the metering wheel with the measurement surface, thereby changing the effect of metal elastic crowding. Both of these can give repeatability errors.

FIG. 1 illustrates in side view a typical measuring wheel 11 for practice of this invention. The wheel 11 illustrated in FIG. 1 is exaggerated in proportion for purposes of exposition. As illustrated in this presently preferred embodiment, the wheel has a first face 21 and an opposing face 22 parallel thereto on the opposite side of the wheel. The periphery 23 of the wheel has an arcuate profile with a radius of curvature which is preferably greater than the radius of the wheel and an assymetrically positioned locus of centers for the curvature so that the line of maximum circumferential extent 24 is much nearer the lower face 21 than the upper face 22 of the wheel. Thus, as pointed out previously, the circumferential extent of the wheel near the upper face 22 is less than the circumferential extent of the wheel adjacent the lower face 21. Therefore, by tilting the wheel the effective circumference can be varied to obtain any desired degree of accuracy in a manner described in greater detail in U.S. Pat. No. 3,561,121. The radius of the arcuate surface may be less than or equal to the radius of the wheel.

Previously, it has been the practice to grind the measuring wheel for a measuring instrument in a direction such that the grinding marks extend in the circumferential direction around the periphery of the wheel. This is done for greatest ease of manufacture and ability to maintain circularity of the wheel and obtain a precisely predetermined circumference. Measuring wheels are sometimes polished after grinding.

In practice of this invention, on the other hand, it is preferred to grind the measuring wheel to its final dimensions in a direction transverse to the circumference of the measuring wheel. This results in a plurality of randomly spaced apart sharp ridges 26 on the periphery of the wheel with the long axis of the ridges transverse to the circumference. Significantly improved results are obtained thereby and repeatability adjustment greatly simplified. Randomness of the spacing of ridges is of significant importance as pointed out in detail hereinafter.

As pointed out hereinafter it is important that the maximum average spacing between ridges be about 10 mils (i.e., 0.010 inch) and that the minimum average spacing between the ridges be greater than about 1 micro inch. Preferably the average spacing between the ridges is about 1 mil for optimum results. It is important that the angle between the slope of the ridge adjacent the crest thereof and a tangent to the wheel at the crest of the ridge be substantially greater than the angle of static friction between the wheel and a surface to be measured so that slippage is precluded. It is also important that the ridges have an average length transverse to the circumference of the wheel more than about three times the average spacing between the ridges. This assures that a maximum force is exerted by the ridges in the circumferential direction of the wheel without substantial increase in the forces exerted in the axial direction. It also assures that the wheel will follow the same trace in a measurement surface despite slight changes in tilt of the wheel or translation in the Z direction.

For purposes of exposition it will be considered that the distance measuring instrument is mounted on a lathe carriage for traversal in the principal direction of the lathe bed, that is, the X direction. The measuring wheel 11 of the distance measuring instrument engages a guideway of the lathe bed for measuring the extent of traversal of the carriage along the bed. The lathe guideway is thus the measurement surface. When a prior art smooth or circumferentially ground friction measuring wheel is rolled along the guideway, a repeatability error may occur since a selected point on the measuring wheel may contact a given point on the guideway during the forward portion of the traverse and be slightly displaced from that given point when the traversal is reversed. This is the case since there is nothing to assure that the measuring wheel follows exactly the smae trace during the forward and reverse portions of the cycle. Exact repeatability could be obtained if the measurement surface were in the form of a rack having teeth and the measuring wheel were in the form of a pinion having teeth engaging those on the rack. Because the pinion must necessarily follow the rack on return, absolute repeatability is assured. Some prior art measurement wheels have included a pinion that embosses teeth on a measurement surface and necessarily returns along said teeth for repeatability.

A regular rack and pinion arrangement, whether formed initially on the surface or formed by embossing, destroys the ability to adjust the friction wheel measuring instrument for accuracy by tilting the wheel. So long as the wheel is constrained to follow a trace of periodic teeth it must return to the same point from which it started, even if the circumference of the wheel is changed slightly as is done by tilting the wheel having an arcuate peripheral surface. If one grinds the periphery of an ordinary pinion so that the teeth are only half as high, it will still roll along a rack in the original manner. The gear ratio is not changed. With regularly spaced teeth repeatability is obtained at the sacrifice of ability to adjust to obtain a desired degree of accuracy.

To obtain accuracy it is important that the measuring wheel return to the origin of its travel along exactly the same trace that it made in leaving the origin. For repeatability it should follow this trace despite minor changes in tilt of the wheel or changes in the engagement force between the wheel and measurement surface. One needs, however, to be able to provide a completely new trace, when desired, in conjunction with deliberate tilting of the wheel to adjust accuracy so that a pre-existing trace has no influence.

There are, therefore, provided sharp ridges on the wheel periphery having their long axis running transverse to the wheel circumference. The ridges are randomly spaced apart rather than periodic, that is, the spacing between the ridges varies from ridge to ridge in a random manner.

To utilize the measuring instrument it is mounted on the machine tool in a conventional manner, accuracy is measured and then adjusted, as required, by tilting the instrument to change the effective measuring wheel circumference. If that were all that was done, the tilted wheel would have ridges adjacent the same trace previously made. This would behave like an ordinary rack and no improvement in accuracy would result. Therefore, prior to tilting the instrument it is withdrawn from engagement with the measurement surface so that the ridges on the wheel no longer engage the surface. The measuring wheel is rotated prior to re-engaging the wheel with the measurement surface. The angle of tilt of the instrument may be adjusted either before or after rotating the wheel.

By withdrawing the wheel from engagement with the measurement surface and rotating the wheel, the randomly spaced ridges thereon cannot mate with a trace previously made in the measurement surface. In the absence of such mating, the trace followed by the measuring wheel on making a new traversal will effectively obliterate any prior trace and form a new one. When the cycle is reversed, the ridges on the measuring wheel will follow the new trace rather than the old one. Thus, the importance of random spacing of the ridges becomes apparent. If the ridges were periodically spaced, rotation of the wheel while disengaged from the measuring surface would have no effect since the wheel would necessarily engage the old periodic trace when brought back into engagement with the surface. The teeth on a pinion engage the teeth on a conventional rack by falling into place irrespective of rotational position of the pinion.

The improved technique for setting the accuracy of the measuring instrument has only a few simple steps. Typically, a 6-inch long measuring standard is employed which coincides with the circumference of the measuring wheel on the commercial English system TRAV-A-DIAL instrument, for example. A conventional dial test indicator is positioned on one of the measuring flats of the 6-inch standard and zeroed to 0.0001 inch; this is done after the housing has been aligned parallel to the X axis by known practices. The measuring instrument is also zeroed. The lathe or other machine tool is then traversed exactly six inches so that the dial test indicator again zeroes on the second measuring flat of a six-inch standard. Any deviation of the indication on the measuring instrument from zero (i.e., 6 inches) is a deviation from accuracy. If the measuring instrument reads more than 6 inches it means that the instrument should be adjusted to reduce the tilt angle. If, on the other hand, the measuring instrument does not quite read six inches it is necessary to increase the tilt-up angle even further until measuring accuracy is achieved.

Once the magnitude and direction of the measurement error have been noted, the spring force pressing the measuring wheel against the measurement surface is removed. This, however, leaves the wheel still in contact with the measurement surface in the typical machine shop set up. The measuring instrument is therefore retracted so that the wheel is disengaged from the measurement surface. The measuring instrument is tilted as required to enhance accuracy. The index wheel is also rotated by an amount that assures that the same ridges as before are not in engagement with the same spot on the measurement surface. A rather small degree of wheel rotation is sufficient since the ridges have close spacing. The degree of shifting needs to be different than an integral number of full rotations of the wheel, that is, different from zero rotation, or one full revolution. It will be apparent, of course, that effective rotation is all that is necessary and that, if desired, traversal of the retracted measuring instrument relative to the measurement surface actually accomplishes the same effect of moving the wheel from its earlier trace. Although this is effective, it is typically easier in practice to merely re-index the wheel. It will also be recognized that the key step is displacing the perimeter of the wheel relative to the measurement surface and that this could be accomplished by sliding the wheel on the surface rather than by disengaging and indexing the wheel. This, however, burnishes the crests off the ridges even on the hardened wheels and the benefits of the ridges in enhancing repeatability are gradually lost. Any manner of displacement between the wheel and measurement surface can suffice to give effective rotation of the wheel. Retraction and rotation is greatly preferred.

After the wheel has been turned relative to the measurement surface, it is re-engaged with the measurement surface and the spring force is reapplied. The accuracy is then measured in exactly the same manner and, if necessary, the steps are repeated until a desired degree of accuracy is obtained.

Retraction of the measuring instrument from the measurement surface can be accomplished by manipulating the conventional mounting base by which it is attached to the machine. However, it is found that once the spring force has been removed it is a simple matter to manually force the instrument away from the measurement surface since the resilience of the mounting and the machine tool typically permits sufficient deflection that the wheel can be freely indexed without engagement with the measurement surface. In practical operation, the key steps are disengagement of the wheel from the measurement surface prior to effective rotation of the wheel followed, by re-engagement for purposes of measurement. The tilt of the measuring instrument for actually adjusting accuracy can be accomplished either before or after indexing the wheel and can be with the wheel in contact with the measurement surface, although it is preferred that it be disengaged. The spring force should be relieved before tilting to avoid overloading.

Referring again to FIGS. A through C, pads 28 are formed on the instrument case 10, and these pads are carefully ground so as to be parallel to the plane of the measuring wheel 11. In adjusting the skew of the measuring instrument, a dial indicator or the like is mounted on the lathe bed and indexed against one of the pads. The carriage is then traversed so that the dial indicator is indexed against the other pad 28. The skew of the measuring instrument is then adjusted to make the wheel parallel to the X axis. Previously, the deviation for parallelism of the wheel from the X axis was adjusted to less than about 0.0005 inch as measured between the two pads which are about 1 13/32 inches apart. From this starting point the skew of the measuring instrument was adjusted to eliminate any repeatability error. Typically, three or four additional adjustments of the skew angle were necessary to completely eliminate the repeatability error.

In practice of this invention wherein randomly spaced apart ridges extend transverse to the wheel circumference, a similar adjustment is used for repeatability error; however, the initial skew adjustment may be made to only about 0.004 inch as measured between the pads 28 and it is quite common that if any additional skew adjustment is required, one such adjustment suffices. This ability of the improved measuring instrument to compensate for repeatability error with a skew angle about eight times as great as before is believed to lie in the formation of a trace by the measuring wheel which is followed by the wheel upon reversal.

It is desirable to have a high coefficient of friction between the wheel and the measurement surface in the X direction (circumferential direction) as the wheel is used in order to minimize any slippage that might occur and result in measurement error. The ridges which engage the measurement surface provide such a high coefficient of friction. At the same time it is desirable to have low coefficient of friction in the Z direction (transverse direction) so as to minimize the degree of cross coupling which tends to change the tilt of the wheel and the engagement force, both of which contribute to repeatability error. Thus, a high coefficient of friction in the X or peripheral direction enhances repeatability and a low coefficient of friction in the Z or transverse direction enhances repeatability.

The randomly spaced ridges which have their long axes extending in the transverse direction provide a high coefficient of friction in the X direction without substantially increasing the coefficient of friction in the Z direction. The same would not be true of pits or spikes formed uniformally over the wheel perimeter such as might be obtained by sandblasting the periphery or by making the wheel porous. Thus, it is found that in order to provide a high ratio between the coefficient of friction in the X direction and the coefficient of friction in the Z direction, the average length of the ridges should be more than about three times the average spacing therebetween. Average length and spacing are used herein in a sense that can be numerical average, mean, or medium without substantial difference. An average value is necessary since the actual spacing between the ridges is random. Typically it is also found when the ridges are produced by grinding that the length is also random. Preferably the average length of the ridges is five to ten times the average spacing since this assures a high ratio of coefficients of friction and this is readily obtainable without undue manufacturing problems.

Another reason for having ridges of a substantial average length relative to the average spacing therebetween is to assure that the wheel actually remains in the same trace despite any minor changes in the angle of tilt or translation in the Z direction during a traverse. If the ridges were too short, a small tilt of the wheel could cause it to miss the original trace and a repeatability error would again be observed.

It is desirable that the ridges be small and sharp in order to form a good trace and to keep them from leaving the trace during reverse travel. The maximum average space between V-shaped ridges on a wheel periphery is determined by the formula $$S = (2C_f R/K)$$

wherein $S$ is the average spacing between the ridges, $C_f$ is the coefficient of friction of the measuring wheel material on the measurement surface material, $R$ is the radius of the wheel, and $K$ is a safety factor. In a typical application wherein a hardened steel wheel is used on a cast iron or steel machine tool part, a coefficient of friction of about 0.2 may be encountered, a wheel with a radius of about one inch is used. When a safety factor of ten is employed, a maximum groove spacing of about 40 mils is obtained. This is substantially an absolute maximum; as a practical matter, a maximum of about 10 mils average groove spacing is actually preferred. In a preferred embodiment the wheel is ground so that the average spacing between the ridges is about 1 mil ($10^{-3}$ inch) which assures high accuracy and excellent repeatability without substantial manufacturing difficulties. It is preferred that the average spacing between ridges be greater than about 1 micro inch since the wheel is then so smooth that no substantial increase in the ratio of coefficients of friction can be obtained.

It is also important that the ridges be sharp so as to properly engage the measurement surface. When the ridges are sharp the pressure (force per unit area) of the wheel against the measurement surface is quite high and a trace is formed in the measurement surface. Conventional grinding of the measurement wheel in a direction transverse to its circumference produces very sharp ridges. The crests that are formed are typically in the same order of size as the crystal size of the metal making the wheel. With a hardened steel wheel, which is preferred in practice of this invention, extremely small grain size is typical and grinding produces very sharp, randomly spaced ridges. Thus by stating that the ridges are sharp, it is meant that the degree of sharpness is substantially that produced by grinding with a conventional abrasive grinding wheel. Such sharp edges may become slightly dulled during use of the measuring instrument, however, such normal wear does not substantially degrade performance of the instrument.

Any significant dulling of the ridges, such as might occur by polishing, burnishing, electrolytic etching or the like will degrade performance of the measuring instrument. It should be noted that such intentional dulling of the sharp ridges would need to be substantial before the instrument would cease to perform as hereinabove described. Thus, by sharp, in defining the ridges, is meant that the peaks are substantially as produced by conventional grinding with no intentional radius or other intentional dulling at the crests of the ridges.

Not only must the crest of the ridge be very narrow but also the slope of the sides of the ridge must be steep. Thus, the angle between the slope of the ridges adjacent the crest of the ridge and a tangent to the wheel at the crest must be substantially greater than the angle of static friction between the wheel and the surface to be measured (the coefficient of friction between two surfaces is the tangent of the angle of static friction). FIG. 3 illustrates the crest of a pair of adjacent ridges 26 spaced apart by distance S. The slope $\delta$ between the side of the ridge and a tangent to the wheel should be substantially greater than the angle of static friction. If it is not substantially greater than the angle of friction, the ridge may slide out of the trace previously made. The wheel is preferably hard steel, harder than the measurement surface so that the ridges do not become burnished and dull after prolonged use.

Although described in greatest detail hereinabove with respect to a measuring wheel deliberately crowned for adjustment of measurement accuracy, the principles of this invention are also applicable to a measuring instrument in which the periphery of the measuring wheel is in the form of a right circular cylinder. Thus, such a cylindrical wheel with randomly spaced sharp ridges extending transverse to the circumference of the wheel prevents repeatability error independent of the tilting technique for compensating measurement errors.

In one embodiment of measuring instrument, a wheel having a right circular cylinder for a periphery is used. If it is found that the right circular cylinder is not quite of the desired circumference, or if there is some other measurement error, an external compensation for this measurement error can be used. Typically, such an instrument has an electronic read-out wherein rotation of the measuring wheel is sensed directly or indirectly by an electronic sensor, such as, for example, a photocell. With suitable conventional circuitry this rotation of the measuring wheel can be translated into a distance or angular measurement in any selected units without substantial difficulty. Several techniques are then available for adjusting the measurement indicated by the instrument to coincide with the true distance traversed by the wheel. These techniques spread the measured deviation from accuracy over the entire measurement distance so that high accuracy can be obtained over short or long distance measurements, or over measurements of angle. With such an adjustable electronic read-out, a wheel having a right circular cylindrical periphery can be used in lieu of the arcuate periphery hereinabove described and illustrated.

Even when the accuracy of measurement of the instrument is electronically adjusted repeatability errors may be introduced due the mechanical hysteresis of the machine tool on which the instrument is mounted. The randomly spaced sharp ridges still introduce a trace in the measurement surface and thereby prevent reproducibility errors. The fact that the ridges are randomly spaced apart becomes less important when the wheel has a right circular cylindrical periphery than when it has an arcuate periphery since measurement errors are compensated electronically and the adjustment technique wherein the instrument is disengaged from the surface and tilted is not required. Sharpness and substantial length transverse to the wheel circumference are still of significant importance. Randomness remains of some importance, however, since the preferred technique for producing the sharp ridges is by conventional grinding. This is by far the most economical technique for preparing sharp ridges in the periphery of the wheel. The measuring wheel is preferably hardened steel and techniques for cutting regularly spaced ridges on the periphery thereof are quite expensive. If the wheel is provided with sharp transverse ridges prior to hardening, the hardening operation may introduce distortion, which would produce a short order measurement error, which cannot readily be compensated by electronic techniques.

Although limited embodiments of this invention have been described and illustrated herein, many modifications and variations will be apparent to one skilled in the art. Thus, for example, although the ridges are stated to be random, and such is apparently the case when they are produced by grinding, it will also be apparent to one skilled in the art, that pseudo-random ridges having a predetermined nonuniform aperiodic spacing can also be employed. Long ridges that run clear across the periphery from face-to-face of the wheel would be preferred but as a practical matter in a typical grinding operation the ridges are shorter and may be three to ten times the average spacing of the ridges. Many other modifications and variations will be apparent to one skilled in the art and it is therefore to be understood that within the scope of the appended claims the invention may be practiced otherwise than as specifically described.

I claim:

1. In a measuring instrument which includes a wheel for engaging and rolling along a surface to be measured, the surface being defined by one of two elements which are movable relative to each other along a path essentially parallel to the surface, the periphery of the wheel being arcuately curved convex away from the wheel axis of rotation whereby the effective radius of the wheel from said axis to the point of engagement with said surface is adjustable by tilting said axis relative to said surface, means for measuring wheel rotation for conversion to a desired measurement, and means for mounting the instrument to the other of the two elements with the wheel adjacent the surface and with the wheel plane of rotation fixed substantially parallel to said path, the improvement comprising:

a plurality of randomly spaced apart ridges on the periphery of the wheel having the long axis of the ridges transverse to the circumference of the wheel.

2. In a measuring instrument as defined in claim 1, the improvement wherein the ridges have an average length more than about three times the average spacing between the ridges.

3. In a measuring instrument as defined in claim 1, the improvement wherein the ridges have an average spacing therebetween less than about 0.010 inch.

4. In a measuring instrument as defined in claim 3, the improvement wherein the ridges have an average spacing therebetween greater than about $10^{-6}$ inch.

5. In a measuring instrument as defined in claim 3, the improvement wherein the ridges have an average spacing therebetween in the order of about $10^{-3}$ inch.

6. In a measuring instrument as defined in claim 1, the improvement wherein the ridges comprise grinding marks from a grinding tool moving in a direction substantially parallel to the axis of rotation of the wheel.

7. In a measuring instrument as defined in claim 1, the improvement wherein the crests of the ridges are substantially as sharp as produced by grinding.

8. In a measuring instrument including a wheel for engaging and rolling along a surface to be measured, the surface being defined by one of two elements which are movable relative to each other along a path essentially parallel to the surface, means for mounting the instrument to the other of the two elements with the wheel adjacent the surface and with the wheel plane of rotation fixed substantially parallel to said path, and means for measuring wheel rotation for conversion to a desired measurement, the improvement comprising:
a plurality of randomly spaced apart ridges on the periphery of the wheel having the long axis of the ridges transverse to the circumferential extent of the wheel, the ridges having an average spacing therebetween less than about 0.010 inch.

9. In a measuring instrument as defined in claim 8 wherein the ridges have an average spacing therebetween greater than about $10^{-6}$ inch.

10. In a measuring instrument as defined in claim 8 wherein the ridges have an average spacing therebetween in the order of about $10^{-3}$ inch.

* * * * *

PO-1050
(5/69)

UNITED STATES PATENT OFFICE
CERTIFICATE OF CORRECTION

Patent No. 3,771,228      Dated November 13, 1973

Inventor(s) Irven H. Culver

It is certified that error appears in the above-identified patent and that said Letters Patent are hereby corrected as shown below:

Col. 4, line 33, reads "$\gamma$" should read --$\alpha$--

Col. 7, line 19, reads "pivotaing", should read --pivoting--

Col. 8, line 68, reads "smae", should read --same--

Signed and sealed this 14th day of May 1974.

(SEAL)
Attest:

EDWARD M. FLETCHER, JR.
Attesting Officer

C. MARSHALL DANN
Commissioner of Patents